United States Patent
Chen et al.

(10) Patent No.: US 10,384,645 B1
(45) Date of Patent: Aug. 20, 2019

(54) VEHICLE ENTRY SYSTEMS

(71) Applicant: Ford Global Technologies, LLC, Dearborn, MI (US)

(72) Inventors: Linsheng Chen, Novi, MI (US); Laura Viviana Hazebrouck, Birmingham, MI (US); Jonathan Diedrich, Carleton, MI (US); Adil Nizam Siddiqui, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 41 days.

(21) Appl. No.: 15/906,434

(22) Filed: Feb. 27, 2018

(51) Int. Cl.
| | |
|---|---|
| *B60J 1/08* | (2006.01) |
| *B60R 25/23* | (2013.01) |
| *F21V 9/14* | (2006.01) |
| *B60Q 1/26* | (2006.01) |
| *B60Q 1/32* | (2006.01) |
| *B60R 25/30* | (2013.01) |
| *G06F 3/042* | (2006.01) |
| *G06F 3/044* | (2006.01) |
| *B32B 17/10* | (2006.01) |

(52) U.S. Cl.
CPC ............... *B60R 25/23* (2013.01); *B60J 1/08* (2013.01); *B60Q 1/268* (2013.01); *B60Q 1/323* (2013.01); *B60R 25/305* (2013.01); *F21V 9/14* (2013.01); *G06F 3/0425* (2013.01); *B32B 17/10541* (2013.01); *B32B 2605/006* (2013.01); *G06F 3/044* (2013.01)

(58) Field of Classification Search
CPC .......... B60R 25/23; B60R 25/305; B60J 1/08; B60Q 1/268; B60Q 1/323; F21V 9/14; G06F 3/0425; G06F 3/3044; B32B 17/10541; B32B 2605/006
See application file for complete search history.

(56) References Cited

U.S. PATENT DOCUMENTS

| | | | | |
|---|---|---|---|---|
| 3,506,423 | A | * 4/1970 | Morris | .................. C03C 21/002 351/159.57 |
| 4,961,625 | A | 10/1990 | Wood et al. | |
| 5,486,840 | A | 1/1996 | Borrego et al. | |
| 7,513,674 | B1 | * 4/2009 | Donahue | .............. G02B 6/0055 362/103 |

(Continued)

FOREIGN PATENT DOCUMENTS

| | | |
|---|---|---|
| DE | 102009057033 A1 | 6/2011 |
| DE | 102015222842 A1 | 5/2017 |

(Continued)

OTHER PUBLICATIONS

Reducing dashboard reflections with a CPL (Circular Polarizer Filter); Dec. 22, 2017 Reducing dashboard reflections with a CPL (Circular Polarizer Filter)—Tools—Mapillary Community forum; 10 pages; https://forum.mapillary.com/t/reducing-dashboard-refelctions-with-a-cpl-circular-polarizer-filter/174/print.

*Primary Examiner* — Lori L Lujak
(74) *Attorney, Agent, or Firm* — Vichit Chea; Price Heneveld LLP

(57) ABSTRACT

A vehicle includes a door. A transparency is coupled to the door including an exterior substrate and an interior substrate. An interlayer is positioned between the exterior substrate and the interior substrate. A polarizer is positioned on the interlayer. An indicium is positioned on the interlayer. A light source is positioned to emit light onto the indicium.

20 Claims, 4 Drawing Sheets

(56) References Cited

U.S. PATENT DOCUMENTS

| | | | | |
|---|---|---|---|---|
| 9,915,767 | B2 * | 3/2018 | You | G02B 5/3041 |
| 9,955,633 | B2 * | 5/2018 | Ichihashi | F21V 9/14 |
| 2006/0164569 | A1 * | 7/2006 | Sobek | E06B 9/24 |
| | | | | 349/96 |
| 2007/0218217 | A1 * | 9/2007 | Fernando | C09K 19/586 |
| | | | | 428/1.31 |
| 2010/0061093 | A1 * | 3/2010 | Janssen | F21K 9/00 |
| | | | | 362/235 |
| 2011/0255155 | A1 * | 10/2011 | Hebrink | B32B 27/08 |
| | | | | 359/359 |
| 2016/0068703 | A1 * | 3/2016 | Schmidt | C09D 5/00 |
| | | | | 428/520 |
| 2016/0257885 | A1 * | 9/2016 | Junge | C09K 19/0208 |
| 2017/0182888 | A1 | 6/2017 | Banyay et al. | |
| 2018/0348509 | A1 * | 12/2018 | Carpenter | G02B 27/0006 |

FOREIGN PATENT DOCUMENTS

| | | | | |
|---|---|---|---|---|
| DE | 102016202464 | A | 8/2017 | |
| WO | WO-2008027031 | A2 * | 3/2008 | B60J 3/06 |

* cited by examiner

VEHICLE ENTRY SYSTEMS

FIELD OF THE INVENTION

The present disclosure generally relates to entry systems, and more particularly to vehicle entry systems.

BACKGROUND OF THE INVENTION

Vehicles incorporate a variety of entry systems. Conventional entry systems utilizing light may be washed out in high ambient lighting conditions. Accordingly, new systems for increasing entry system contrast may be advantageous.

SUMMARY OF THE INVENTION

According to one feature of the present disclosure, a vehicle includes a door. A transparency coupled to the door includes an exterior substrate and an interior substrate. An interlayer is positioned between the exterior substrate and the interior substrate. A polarizer is positioned on the interlayer. An indicium is positioned on the interlayer. A light source is positioned to emit light onto the indicium.

According to another feature of the present disclosure, a vehicle includes a door. A transparency is coupled to the door. An interlayer is positioned between an exterior substrate and an interior substrate. A circular polarizer is positioned between the exterior substrate and the interlayer. An indicium is positioned between the interlayer and the interior substrate. A light source is positioned to emit light onto the indicium.

According to yet another feature of the present disclosure, a vehicle entry system includes a transparency. An interlayer is positioned between an exterior substrate and an interior substrate. A circular polarizer and an indicium are included and the indicium and the circular polarizer are positioned on opposite sides of the interlayer than one another. A light source is positioned to emit light onto the indicium.

These and other aspects, objects, and features of the present disclosure will be understood and appreciated by those skilled in the art upon studying the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

DETAILED DESCRIPTION

Figure 1:
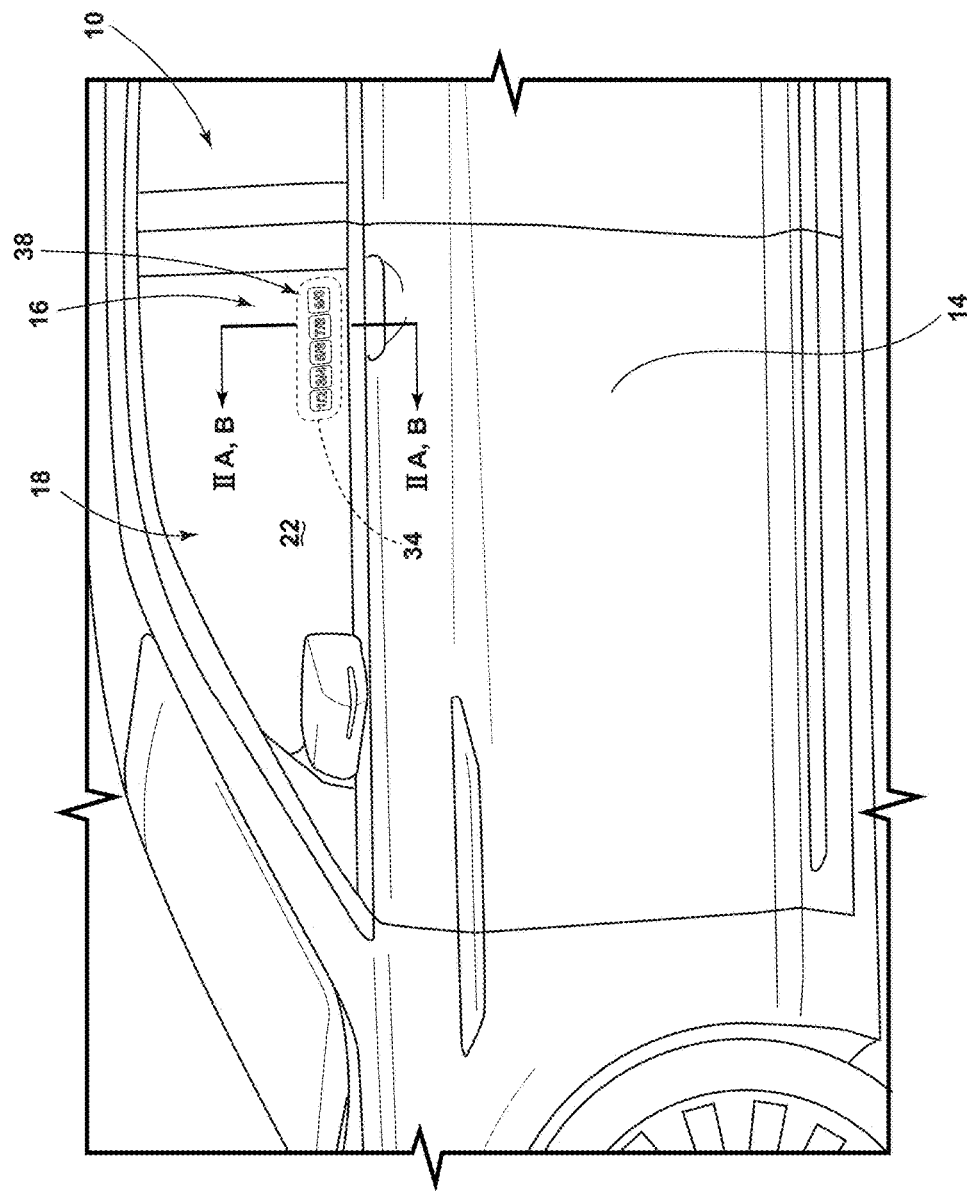
FIG. 1 is a side perspective view of a vehicle, according to at least one example.

Additional features and advantages of the invention will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

It will be understood by one having ordinary skill in the art that construction of the described disclosure, and other components, is not limited to any specific material. Other exemplary embodiments of the disclosure disclosed herein may be formed from a wide variety of materials, unless described otherwise herein.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures, and/or members, or connectors, or other elements of the system, may be varied, and the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

Referring now to FIGS. 1-4, a vehicle 10 includes a door 14, a vehicle entry system 16 and a transparency 18 coupled to the door 14. The transparency 18 includes an exterior substrate 22, an interior substrate 26, an interlayer 30 positioned between the exterior substrate 22 and the interior substrate 26. A polarizer 34 is positioned on the interlayer 30. An indicium 38 is positioned on the interlayer 30. A light source 42 is positioned to emit light onto the indicium 38.

Referring now to FIG. 1, the vehicle 10 is depicted as a sedan, but it will be understood that the vehicle 10 may be a sport utility vehicle, van, truck, cross-over or other vehicle 10 without departing from the teachings provided herein. The vehicle 10 may include a single door 14 or a plurality of doors 14. Although the door 14 is depicted as a standard passenger door 14, it will be understood that the door 14 may be any entry point to the vehicle 10 including vehicle lift gate, tailgate, a butterfly door, gullwing door, sliding door, suicide door, rear door and/or other doors of vehicles 10. The door 14 may include one or more transparencies 18 coupled to the door 14. For example, the transparency 18 may be a passenger window, a quarter window, an opera window, rear window, rear windshield, side windows, and other transparencies 18 coupled to the doors 14. It will be understood that for purposes of this disclosure, the transparency 18 may not need to be coupled to one of the doors 14. For example, the transparency 18 may be a front windshield, a rear sliding window for a truck or other transparencies 18 positioned around the vehicle 10. Regardless of the door 14 and/or transparency 18, the vehicle 10, door 14 and/or transparency 18 may include the vehicle entry system 16. The vehicle 10 may include a single vehicle entry system 16 (e.g., on a driver door) or multiple vehicle entry systems 16 positioned around the vehicle 10. As will be explained in greater detail below, the vehicle entry system 16 may be configured to allow unlocking and/or entry to the vehicle 10.

Figure 2A:
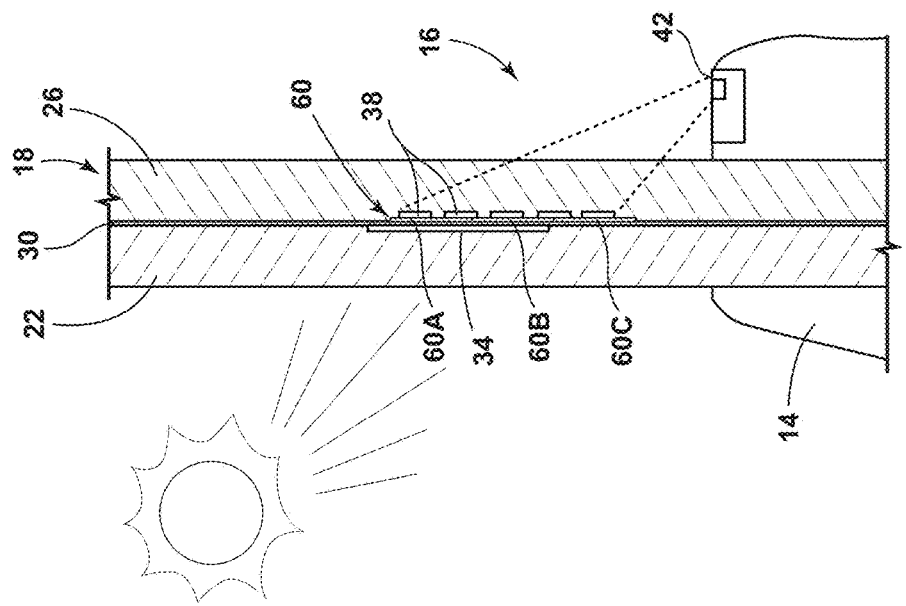
FIG. 2A is a cross-sectional view taken at line IIA-IIA of FIG. 1, according to at least one example.
Figure 2B:
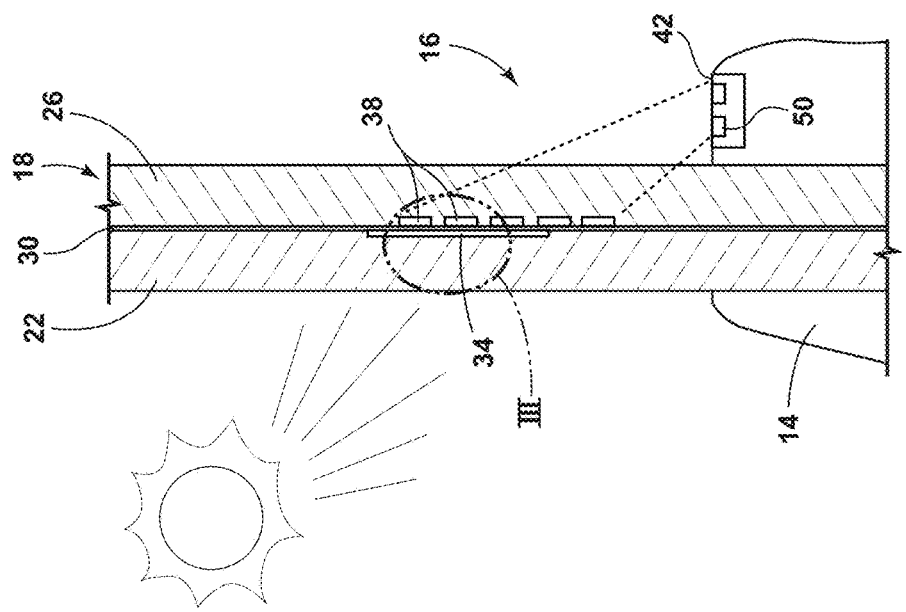
FIG. 2B is a cross-sectional view taken at line IIB-IIB of FIG. 1, according to at least one example.

Referring now to FIGS. 2A and 2B, the transparency 18 may include the exterior and interior substrates 22, 26. For purposes of this disclosure, the exterior substrate 22 is positioned on an outboard, or outer, side of the transparency 18 while the inner substrate 26 is positioned on an inboard, or inner, side of the transparency 18. In other words, the exterior substrate 22 is exposed to the environment around the vehicle 10 while the interior substrate 26 is exposed to an interior cabin of the vehicle 10. The exterior and/or interior substrates 22, 26 may be composed of a material which is transparent or substantially transparent to visible light (e.g., light having a wavelength of from about 400 nm to about 700 nm). It will be understood that the exterior and/or interior substrates 22, 26 may have a different level of transmittance of infrared (e.g., light having a wavelength of greater than about 700 nm) and/or ultraviolet (e.g., light having a wavelength of from about 180 nm to about 400 nm) light as compared to the transmittance of visible light. The exterior and/or interior substrates 22, 26 may be composed of a glass, polymeric material and/or combinations thereof. In glass examples, the exterior and/or interior substrates 22, 26 may be composed of soda-lime float glass, alkaline earth boro-aluminosilicate glass, alkali-aluminosilicate glass, borosilicate glass, chemically strengthened glass, heat-strengthened glass, insulated glass, tempered glass and/or combinations thereof. In polymeric examples, the exterior and/or interior substrates 22, 26 may be composed of polysulfone, acrylic, polycarbonate, cycloolefin, polyethylene terephthalate, polyethylene naphthalate, polyimide, polychlorotrifluoroethylene, polyphenylene sulfide, poly(methyl methacrylate), high density polyethylene, acrylonitrile butadiene styrene, polyvinyl alcohol, ethylene vinyl alcohol, moisture-resistant polymers and/or combinations thereof. It will be understood that the materials of the exterior and interior substrates 22, 26 may be the same or different than one another.

The exterior and/or interior substrates 22, 26 may each have a thickness of from about 1.0 mm to about 2.5 mm. For example, the individual thicknesses of the exterior and/or interior substrates 22, 26 may be about 1.0 mm or greater, about 1.1 mm or greater, about 1.2 mm or greater, about 1.3 mm or greater, about 1.4 mm or greater, about 1.5 mm or greater, about 1.6 mm or greater, about 1.7 mm or greater, about 1.8 mm or greater, about 1.9 mm or greater, about 2.0 mm or greater, about 2.1 mm or greater, about 2.3 mm or greater, about 2.4 mm or greater, about 2.5 mm or greater or any and all values and ranges therebetween. It will be understood that the thicknesses of the exterior and/or interior substrates 22, 26 may vary over the length of the substrates 22, 26.

The interlayer 30 is positioned between the exterior substrate 22 and the interior substrate 26. The interlayer 30 may extend across only a portion of an interface between the exterior and interior substrates 22, 26, or may extend across the entire interface. As such, the transparency 18 may be known as a laminated article. According to various examples, the interlayer 30 may be composed of a polymeric material. For example, the interlayer 30 may be composed of polyvinyl butyral or ethylene-vinyl acetate (EVA), polycarbonate, thermoplastic polyurethane, thermoplastic materials, thermoset EVA, polyethylene terephthalate and/or combinations thereof.

The interlayer 30 may have a thickness of from about 0.2 mm to about 0.5 mm. For example, the thickness of the interlayer 30 may be about 0.2 mm or greater, about 0.25 mm or greater, about 0.27 mm or greater, about 0.3 mm or greater, about 0.32 mm or greater, about 0.34 mm or greater, about 0.36 mm or greater, about 0.38 mm or greater, about 0.4 mm or greater, about 0.42 mm or greater, about 0.44 mm or greater, about 0.46 mm or greater, about 0.48 mm or greater, about 0.5 mm or greater or any and all values and ranges therebetween. It will be understood that the thicknesses of interlayer 30 may vary over the length of the transparency 18.

According to various examples, the indicium 38 is positioned between the interior substrate 26 and the interlayer 30. Additionally or alternatively, the indicium 38 may be positioned between the exterior substrate 22 and the interlayer 30. According to various examples, the transparency 18 may include multiple indicia 38. The indicium 38 may be in the form of text, numbers, symbols, pictures and/or combinations thereof. According to various examples, the indicium 38 may be in the form of a number key pad. It will be understood that the number key pad examples may be composed of a single, unitary, indicium 38 or that multiple indicia 38 may cooperate to form the key pad. For example, numbers of the key pad may be grouped into a single indicium 38 or each number may be a separate indicium 38.

Further, it will be understood that other examples (e.g., pictures, text, symbols) may be a grouping of indicia 38 or a single indicium 38.

The indicium 38 may be composed of an ink, dye, pigment or colorant in order to define a visible indicium 38. The indicium 38, during manufacturing, may be applied to the interlayer 30, the exterior substrate 22 and/or the interior substrate 26. The indicium 38 may be applied in an aqueous, liquid, paste and/or powder form to the interlayer 30, the exterior substrate 22 and/or the interior substrate 26. According to various examples, the ink, dye, pigment or colorant of the indicium 38 may be photoluminescent, phosphorescent and/or configured to emit visible light in response to receiving an excitation emission from the light source 42. The excitation emission which charges, or energizes, the indicium 38 may be infrared light, visible light and/or ultraviolet light. As such, the indicium 38 may include an ink configured to emit light when energized by the light source 42. The light given off by the charged or energized indicium 38 may be visually perceived as a glow or luminance from the transparency 18.

As explained above, the light source 42 is positioned to emit light onto the indicium 38. The light source 42 may be positioned at a variety of points within the vehicle 10 which may allow the light emitted from the light source 42 to fall on the indicium 38. For example, the light source 42 may be positioned in the door 14, in a headliner, in an instrument panel, in a trim component of the door 14, a handle assembly of the door 14, an A- or B-pillar of the vehicle 10, a seat of the vehicle 10 and/or other locations around the vehicle 10. It will be understood that the light source 42 may be positioned in an interior and/or an exterior of the vehicle 10. Further, it will be understood that the vehicle 10 may contain a plurality of light sources 42 configured to illuminate the indicium 38. According to various examples, the light source 42 may be positioned at an edge of the transparency 18 such that the transparency 18 functions as a wave guide for the light emitted from the light source 42 to reach the indicium 38.

The light source 42 is configured to emit one or more types of light. For example the light source 42 may emit ultraviolet light, visible light and/or infrared light. As such, the light source 42 may function to both charge, or excite, the indicium 38 as well as illuminate the indicium 38. For example, the light source 42 may be configured to emit ultraviolet light to charge the indicium 38 while also illuminating the indicium 38 in a colored light (e.g., red, green and/or blue) to provide aesthetically pleasing appearances to the indicium 38.

Referring now to FIG. 2A, according to various examples, an imager 50 may be positioned proximate the transparency 18 to detect where a user of the vehicle entry system 16 touches the indicium 38. For example, the imager 50 may be configured to detect or sense visible light and/or infrared light to tell where a user's finger touches the indicium 38. As such, the imager 50 may be configured to image the indicium 38 or gather light from the area the indicium 38 is located. It will be understood that in examples where the indicium 38 is positioned inside of the transparency 18 the user does not physically touch the indicium 38, but appears to touch it due to the transparency of the exterior substrate 22. As will be explained in greater detail below, in keypad examples of the indicium 38, a user may touch various "keys" or "numbers" of the indicium 38 and the imager 50 may detect the order in which the indicium 38 was touched. Such information gathered by the imager 50 may be transmitted to a controller which controls operation of features of the vehicle 10 (e.g., the entry system 16).

The imager 50 may be positioned in the door 14, in a headliner, in an instrument panel, in a trim component of the door 14, a handle assembly of the door 14, an A- or B-pillar of the vehicle 10, a seat of the vehicle 10 and/or other locations around the vehicle 10. In the depicted example, the imager 50 is positioned proximate to the light source 42, but it will be understood that the imager 50 may be placed in a different location than the light source 42. According to various examples, both the imager 50 and the light source 42 are positioned externally to the transparency 18 (i.e., not part of the transparency 18). The imager 50 may be a charge-coupled device and/or a complementary metal-oxide semiconductor. It will be understood that other types of imagers 50 may be utilized without departing from the teachings provided herein.

Referring now to FIG. 2B, the vehicle entry system 16 may include a proximity sensor 60. The proximity sensor 60 may be used additionally or alternatively with/to the imager 50. The proximity sensor 60 is configured to detect the presence of a user's finger or other object contacting or coming close to the indicium 38 of the transparency 18. As such, in examples where the transparency includes indicia 38, the transparency 18 may also include a plurality of proximity sensors 60. Further, each of the proximity sensors 60 may be positioned proximate an indicium 38 such that when a user tries to touch the indicium 38, the proximity sensor 60 detects the touch. In some examples, the proximity sensors 60 may be implemented as capacitive sensors, but it will be understood that other types of proximity sensors may be used in addition to and/or alternatively to any other practicable sensor. Other examples of the proximity sensors of the proximity sensor 60 may include, but are not limited to, magnetic sensors, inductive sensors, optical sensors, resistive sensors, temperature sensors, the like, or any combination thereof.

Capacitive sensors detect changes in capacitance due to the placement or movement of an object such as a finger proximate to the indicium 38. A user's finger may tap or swipe on or near the indicium 38 to register a detection of the finger. The proximity sensor 60 in capacitive examples, may be formed by a first conductive portion 60A and a second conductive portion 60B. An insulative layer 60C is positioned between the first and second conductive portions 60A, 60B. Capacitive sensors may be actuatable with substantially no force to realize sensor activation. The actual sensitivity of this type of sensor 60 can be tuned via a detection circuit.

Figure 3:
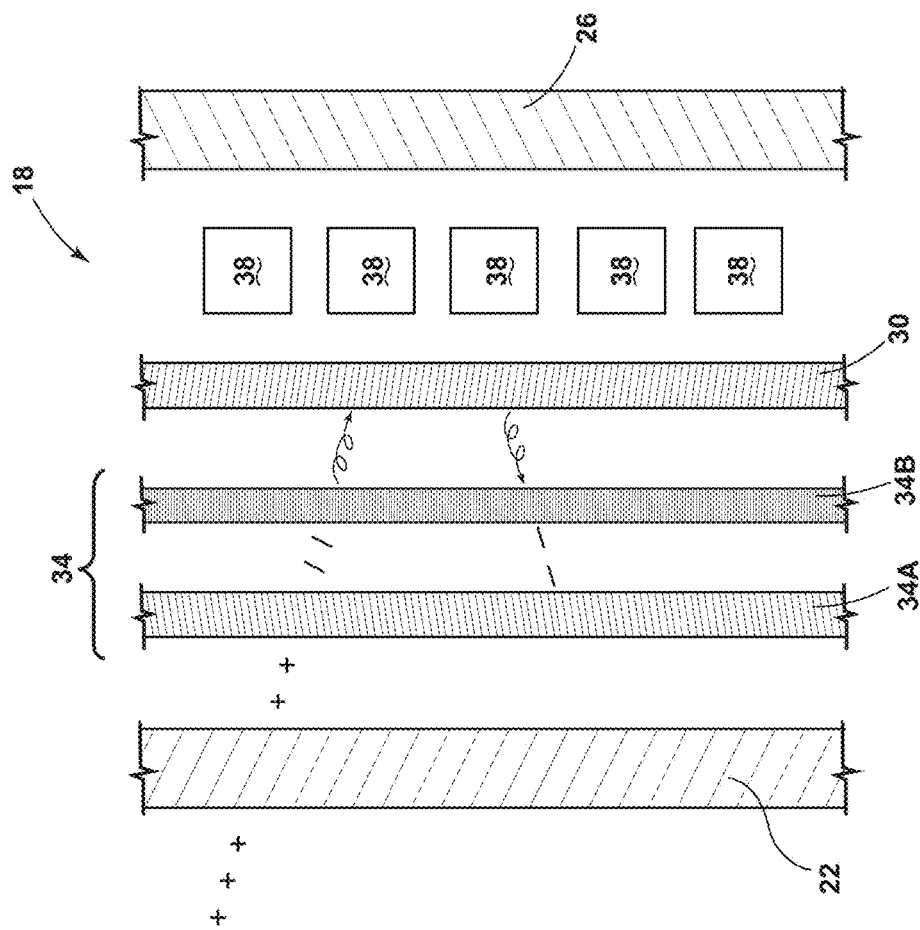
FIG. 3 an enhanced and exploded view of section III of FIG. 2A, according to at least one example.

Referring now to FIGS. 2A-3, ambient lighting conditions around the vehicle 10 may produce a glare or reflection which decreases the visibility of the indicium 38. As such, the transparency 18 may include one or more polarizers 34. The polarizer 34 may be positioned between the exterior substrate 22 and the interlayer 30, but it will be understood that the polarizer 34 may be positioned between the indicium 38 and the interlayer 30. According to various examples, the indicium 38 and the polarizer 34 are positioned on opposite sides of the interlayer 30 than one another. The polarizer 34 may be laminated to the exterior substrate 22 and/or the interlayer 30. The polarizer 34 may be a wire grid polarizer, a dual brightness-enhancing film polarizer, or other types of polarizers 34. The polarizer 34 may be a linear polarizer or a circular polarizer. In circular polarizer examples of the polarizer 34, the polarizer 34 may include a linear polarizer 34A and a quarter wave retarder 34B. The polarizer 34 may extend fully over the area of the transparency 18 including the indicium 38 or over portions of the transparency 18. Further, it will be understood that the transparency may include a plurality of polarizers 34.

In operation, ambient light (i.e., light having vertically and horizontally polarized light) from the environment around the vehicle 10 passes through the linear polarizer 34A such that horizontally polarized light (e.g., the polarization of light typically attributed to glare) is absorbed and vertically polarized light is transmitted. As the vertically polarized light passes through the quarter wave retarder 34B, it is converted to a first circular polarization of light. The first circular polarization of light of light is then reflected from the interface between the interlayer 30 and the indicium 38 and/or the interface between the indicium 38/interlayer 30 and the interior substrate 26. The reflection of the first circular polarization of light converts the first circular polarization of light to a second, opposite, circular polarization of light. The second polarization of light then passes back through the quarter wave retarder 34B and is rotated or converted into horizontally polarized light and is blocked by the linear polarizer 34A. As such, a portion, a majority and/or substantially all of the ambient light is blocked from exiting the transparency 18. As such, ambient illumination may be reduced or eliminated from reflecting and impeding a viewer's ability to discern the indicium 38.

Figure 4:
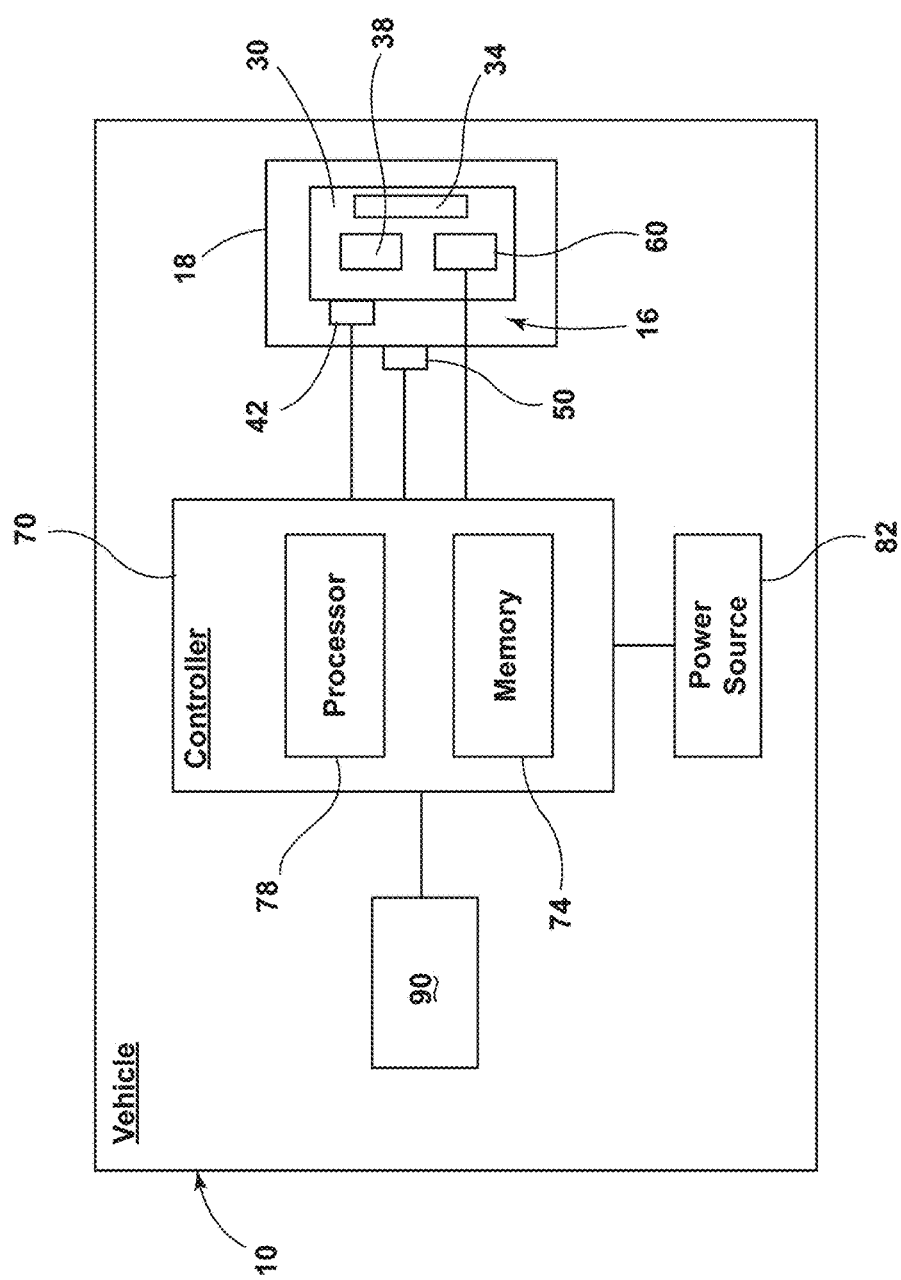
FIG. 4 is a schematic view of the vehicle, according to at least one example.

Referring now to FIG. 4, a block diagram of the vehicle 10 is shown in which the transparency 18 is included. The vehicle 10 includes a controller 70 in communication with the light source 42 and the imager 50 and/or proximity sensor 60. The controller 70 may include a memory 74 having instructions contained therein that are executed by a processor 78 of the controller 70. The controller 70 may provide electrical power to light source 42, imager 50 and/or proximity sensor 60 via a power source 82 located onboard the vehicle 10. In addition, the controller 70 may be configured to control the light source 42, imager 50 and/or proximity sensor 60 based on feedback received from one or more vehicle control modules. For example, the vehicle control modules may include a handle sensor 90 configured to detect if a hand has grabbed a handle of the vehicle 10. The controller 70 may be configured to activate the light source 42, imager 50 and/or proximity sensor 60. For example, if the handle sensor 90 determines that a user has grabbed the handle, this may indicate that a user wishes to enter the vehicle 10 so the controller 70 may power the light source 42 to illuminate the indicium 38 and the imager 50 may begin imaging the indicium 38 to determine if the user wishes to input a passcode into keypad examples of the indicium 38. As the imager 50 and/or proximity sensor 60 detect the passcode input, the proximity sensors 60 return the information to the controller 70 such that the controller 70 may unlock the doors 14 of the vehicle 10 if the correct passcode is entered.

Use of the present disclosure may offer a variety of advantages. First, use of the polarizer 34 with the transparency 18 allows the reducing of glare and/or reflected ambient light such that use of the polarizer 34 may increase the visibility of the indicium 38 in high ambient lighting conditions. Second, as the polarizer 34 is positioned within the transparency 18, the polarizer may be protected from environmental exposure. Third, the vehicle entry system 16 may offer a high degree of robust functionality while also providing an aesthetically pleasing appearance.

According to various embodiments, a vehicle includes a door and a transparency coupled to the door. The transparency includes an exterior substrate, an interior substrate, an interlayer positioned between the exterior substrate and the interior substrate, a polarizer positioned on the interlayer and an indicium positioned on the interlayer. A light source is positioned to emit light onto the indicium. Embodiments of the vehicle can include any one or a combination of the following features:
  the polarizer is positioned between the exterior substrate and the interlayer;
  the indicium is positioned between the interior substrate and the interlayer;
  the light source is configured to emit ultraviolet light;
  the light source is positioned on the door;
  the indicium is configured as a keypad;
  the indicium comprises an ink configured to emit light when energized by the light source;
  the interlayer comprises a polymeric material;
  a proximity sensor is positioned proximate the indicium;
  the polarizer is a circular polarizer;
  an imager is configured to image the indicium;
  the imager is positioned on the door; and
  the imager is positioned proximate the light source.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable and/or physically interacting components and/or wirelessly interactable and/or wirelessly interacting components and/or logically interacting and/or logically interactable components. Furthermore, it will be understood that a component preceding the term "of the" may be disposed at any practicable location (e.g., on, within, and/or externally disposed from the vehicle) such that the component may function in any manner described herein.

What is claimed is:

1. A vehicle comprising:
  a door;
  a transparency coupled to the door, comprising
    an exterior substrate;
    an interior substrate;
    an interlayer positioned between the exterior substrate and the interior substrate;
    a polarizer positioned on the interlayer; and
    an indicium positioned on the interlayer; and
  a light source positioned to emit light onto the indicium.

2. The vehicle of claim 1, wherein the polarizer is a circular polarizer.

3. The vehicle of claim 1, wherein the polarizer is positioned between the exterior substrate and the interlayer.

4. The vehicle of claim 1, wherein the indicium is positioned between the interior substrate and the interlayer.

5. The vehicle of claim 1, wherein the light source is configured to emit ultraviolet light.

6. The vehicle of claim 1, wherein the light source is positioned on the door.

7. The vehicle of claim 1, further comprising:
an imager configured to image the indicium.

8. The vehicle of claim 7, wherein the imager is positioned on the door.

9. The vehicle of claim 8, wherein the imager is positioned proximate the light source.

10. The vehicle of claim 8, wherein the imager is configured to sense visible light.

11. The vehicle of claim 9, wherein the imager is configured to sense infrared light.

12. A vehicle, comprising
a door;
a transparency coupled to the door, comprising
an interlayer positioned between an exterior substrate and an interior substrate;
a circular polarizer positioned between the exterior substrate and the interlayer; and
an indicium positioned between the interlayer and the interior substrate; and
a light source positioned to emit light onto the indicium.

13. The vehicle of claim 12, wherein the indicium is configured as a keypad.

14. The vehicle of claim 12, wherein the indicium comprises an ink configured to emit light when energized by the light source.

15. The vehicle of claim 12, wherein the interlayer comprises a polymeric material.

16. The vehicle of claim 12, further comprising:
a proximity sensor positioned proximate the indicium.

17. A vehicle entry system, comprising:
a transparency comprising:
an interlayer positioned between an exterior substrate and an interior substrate;
a circular polarizer; and
an indicium, wherein the indicium and the circular polarizer are positioned on opposite sides of the interlayer than one another; and
a light source positioned to emit light onto the indicium.

18. The vehicle entry system of claim 17, further comprising:
an imager configured to image the indicium.

19. The vehicle entry system of claim 18, wherein both the imager and the light source are positioned externally to the transparency.

20. The vehicle entry system of claim 17, further comprising:
a proximity sensor positioned proximate the indicium.

* * * * *